United States Patent
Mikhailov et al.

(10) Patent No.: US 9,781,077 B2
(45) Date of Patent: Oct. 3, 2017

(54) MEDIA DISTRIBUTION SYSTEM WITH MANIFEST-BASED ENTITLEMENT ENFORCEMENT

(71) Applicant: AZUKI SYSTEMS, INC., Acton, MA (US)

(72) Inventors: Mikhail Mikhailov, Newton, MA (US); Raj Nair, Lexington, MA (US)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 14/907,132

(22) PCT Filed: Jul. 23, 2014

(86) PCT No.: PCT/US2014/047827
§ 371 (c)(1),
(2) Date: Jan. 22, 2016

(87) PCT Pub. No.: WO2015/013411
PCT Pub. Date: Jan. 29, 2015

(65) Prior Publication Data
US 2016/0164841 A1 Jun. 9, 2016

Related U.S. Application Data

(60) Provisional application No. 61/857,653, filed on Jul. 23, 2013.

(51) Int. Cl.
*H04L 9/32* (2006.01)
*H04L 29/06* (2006.01)
(Continued)

(52) U.S. Cl.
CPC .......... *H04L 63/0281* (2013.01); *G06F 21/10* (2013.01); *G06F 21/128* (2013.01); *G06F 21/57* (2013.01); *H04L 63/0457* (2013.01); *H04L 63/105* (2013.01); *H04N 21/2541* (2013.01); *H04N 21/26258* (2013.01); *H04N 21/4318* (2013.01); *H04N 21/4367* (2013.01); *H04N 21/4431* (2013.01); *H04N 21/4622* (2013.01); *H04N 21/4627* (2013.01); *H04N 21/63345* (2013.01); *H04N 21/64322* (2013.01);
(Continued)

(58) Field of Classification Search
CPC ........................................................ H04L 9/32
See application file for complete search history.

(56) References Cited

U.S. PATENT DOCUMENTS

| | | | |
|---|---|---|---|
| 2004/0003139 A1* | 1/2004 | Cottrille | H04L 63/0823 719/331 |
| 2011/0225417 A1 | 9/2011 | Maharajh et al. | |
| 2013/0166906 A1 | 6/2013 | Swaminathan et al. | |

FOREIGN PATENT DOCUMENTS

| | | |
|---|---|---|
| WO | WO 2011/041916 A1 | 4/2011 |
| WO | WO 2011/140288 A1 | 11/2011 |

* cited by examiner

Primary Examiner — Josnel Jeudy

(57) ABSTRACT

A method for enforcing entitlements includes configuring a wide variety of entitlements at a server; determining applicable combination of entitlements for a given client request; sending entitlements to the requesting client securely; handling entitlement information securely on a plurality of client devices at run time; storing entitlement information securely on a plurality of client devices for offline use; and enforcing entitlements on a plurality of client devices. The method employs manipulation of manifest files by a proxy that may be included in the client device or located in the network.

29 Claims, 4 Drawing Sheets

(51) Int. Cl.
 *G06F 21/10* (2013.01)
 *G06F 21/57* (2013.01)
 *H04N 21/254* (2011.01)
 *H04N 21/6334* (2011.01)
 *H04N 21/643* (2011.01)
 *H04N 21/8355* (2011.01)
 *G06F 21/12* (2013.01)
 *H04N 21/262* (2011.01)
 *H04N 21/4367* (2011.01)
 *H04N 21/443* (2011.01)
 *H04N 21/462* (2011.01)
 *H04N 21/4627* (2011.01)
 *H04N 21/654* (2011.01)
 *H04N 21/845* (2011.01)
 *H04N 21/431* (2011.01)
 *H04N 21/414* (2011.01)

(52) U.S. Cl.
 CPC ....... *H04N 21/654* (2013.01); *H04N 21/8355* (2013.01); *H04N 21/8456* (2013.01); *G06F 2221/2141* (2013.01); *G06F 2221/2145* (2013.01); *H04L 2463/101* (2013.01); *H04N 21/41407* (2013.01)

MEDIA DISTRIBUTION SYSTEM WITH MANIFEST-BASED ENTITLEMENT ENFORCEMENT

This application is a national phase entry of PCT/US2014/047827, filed Jul. 23, 2014, which claims the benefit of U.S. Provisional Application No. 61/857,653, filed Jul. 23, 2013, the disclosures of which are fully incorporated herein by reference.

SUMMARY

The disclosure relates in general to over-the-top (OTT) media delivery and more specifically to enforcement of a wide variety of entitlements on different types of client devices in real-time.

Traditional Conditional Access (CA) systems, implemented in Set Top Boxes (STBs), support only a very limited ON/OFF entitlements, indicating whether a user is allowed to watch a particular channel or not. Increasingly more popular over-the-top (OTT) media delivery to a wide variety of devices presents both challenges and opportunities in offering a substantially wider, and ever increasing, array of entitlements. OTT delivery ecosystems require an ability to configure a growing number of entitlements for different users and user groups, media and media groups, devices, and various combinations thereof, along with secure delivery of properly identified set of requirements for a given user/media/device combination, secure handling, storage, and enforcement of these entitlements on each client device.

Methods and apparatus are disclosed for enforcing a wide variety of entitlements in real time in over-the-top (OTT) video delivery. OTT content delivery typically relies on a segment-based retrieval paradigm using the HTTP protocol. HTTP adaptive streaming uses multiple encodings (each encoded at a different bitrate, resolution, and/or frame rate), allowing the client to select an appropriate encoding for its local network conditions. Manifest files are used to convey encoding information and to indicate segment retrieval locations to clients. For real-time (live) content, segments and manifest files are produced and retrieved by clients in real-time.

More specifically, a disclosed method for enforcing entitlements may include configuring a wide variety of entitlements at a server; determining applicable combination of entitlements for a given client request; sending entitlements to the requesting client securely; handling entitlement information securely on a plurality of client devices at run time; storing entitlement information securely on a plurality of client devices for offline use; and enforcing entitlements on a plurality of client devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
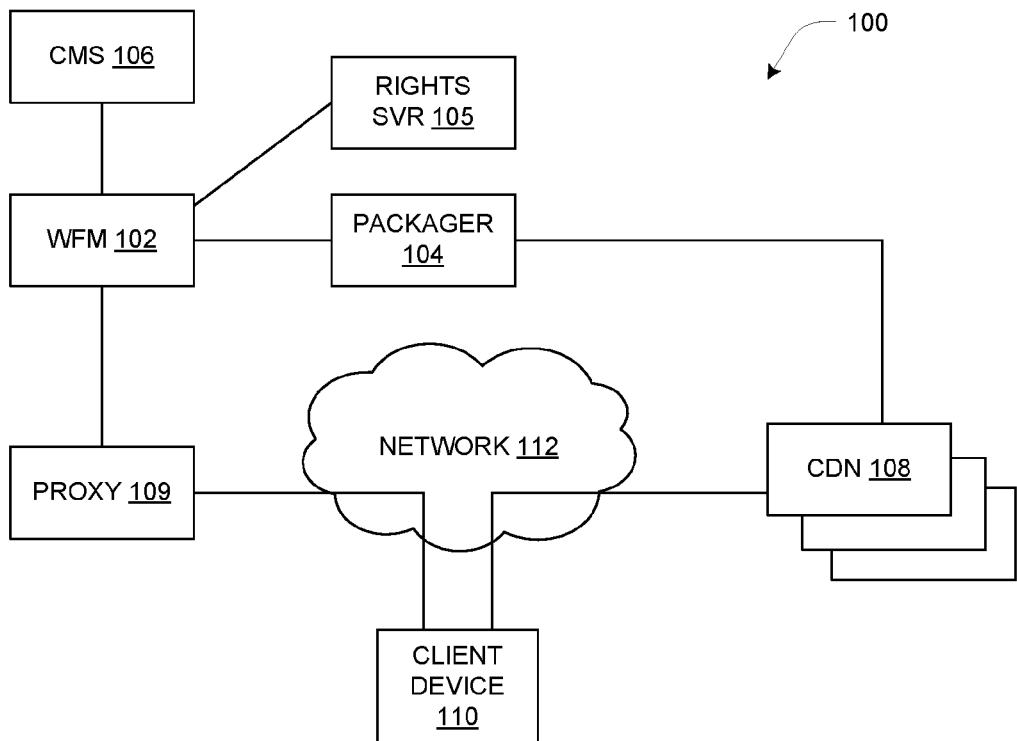
FIG. 1 is a block diagram of a media distribution system.

FIG. 1 is a block diagram of a system 100 for one embodiment of the present invention. As shown, it includes a workflow manager (WFM) 102, one or more packaging servers or "packager(s)" 104, a rights server 105, a content management system (CMS) 106, a content delivery network (CDN) 108, a proxy server or "proxy" 109, and client devices or "clients" 110. Network connections among devices are illustrated generally as network 112. Generally in operation, the packager(s) 104 receive source content and process or "package" the source content so that it may be delivered to the clients 110 via the CDN 108. Specifically, the packager(s) 104 perform transcoding and content encryption using a series of content encryption keys as described below. The CMS 106 provides high-level control over content ingestion, packaging and delivery, while the WFM 102 performs more detailed control operations.

The workflow manger (WFM) 102 is responsible for acquiring source content information from the content management system (CMS) 106 and instructing one or more packagers 104 to prepare the content for distribution. In one embodiment, preparation includes transcoding audio and video into a plurality of encodings using different codecs, bitrates, frame rates, sample rates, and resolutions. The transcoded content is then written into a plurality of output files. In one embodiment, a plurality of output files contain the same transcoded content encapsulated in different container formats (e.g., 3GP, MP4, MPEG-TS, WMV, MOV, etc.). In one embodiment, the prepared output files are segmented into fixed duration segment files (e.g., MPEG-TS segments, fragmented MP4 segments, 3GP DASH segments, etc.). In one embodiment, the output files, both segmented and un-segmented, are encrypted using standard encryption protocols (e.g., AES-128, HC-128, RC4, etc.). In one embodiment, all preparation steps are performed by a single content packaging server 104, referred to herein as a packager.

In another embodiment, individual preparation steps (e.g., transcoding, segmentation, encryption, etc.) may be performed across different physical content packaging servers 104. In one embodiment the WFM 102 and packager 104 reside in the same physical server. In another embodiment, the WFM 102 and packager 104 reside in different physical servers in the same data center. In another embodiment, the WFM 102 and packager 104 reside in different physical servers in remote data centers.

It will be appreciated that the term "server" used herein refers to a general-purpose or special-purpose computer, generally including memory, input/output circuitry, and instruction processing logic along with interconnections such as one or more high-speed data buses connecting those components together. Many aspects of the disclosed techniques can be embodied as software executing on one or more server computers. Similarly, a "client" herein is a computerized device (also including the above components) capable of receiving content from a network connection and decoding and rending the content on a display or similar output device. So-called smartphones are specifically included within the definition of client as used herein.

In one embodiment, the packager 104 produces segments with fixed sized GOPs. In another embodiment, the packager 104 produces segments with variable sized GOPs. Once the segments are complete, the packager 104 uploads the segments to the content delivery network (CDN) 108.

The client 110 issues a playback request to the WFM 102 via the proxy 109. The WFM 102 responds with information about the content, including content location in the CDN 108 and content encodings (e.g., different bitrates, different formats, etc.). This information is provided in manifest files. The client 110 uses the information in the manifest file to issue requests for segments from the CDN 108 for playback. As described more below, the proxy 109 can selectively manipulate contents of returned manifest files to cause the client 110 to modify the manner of playback or even stop playback completely when warranted. This operation of the proxy 109 is based on a collection of rights information referred to herein as "entitlements".

The client device 110 is generally a computerized device having playback capability including the decryption of encrypted content files, including for example a personal computer, tablet computer, smart phone, etc. Decryption keys used in to decrypt the encrypted content files are provided to the client device 110 by the backend. In operation, the client device 110 authenticates itself to the backend and provides information establishing its authorization to play identified encrypted content (e.g., a particular video). The backend responds by providing one or more decryption keys enabling the client device 110 to decrypt the content file(s) for the video. The client device 110 obtains the encrypted content files from a content server (e.g., in CDN 108), decrypts them using the decryption keys, and then renders (plays) the decrypted content.

The WFM 102, packager 104, rights server 105 and CMS 106 are "backend" facilities and may be implemented using one or more server computers, which may be co-located (e.g., in a datacenter) or distributed in some manner over multiple locations. In operation, content from a content publisher may be ingested and then segmented for segment-based delivery to client devices 110. A media preparation engine of the WFM 102 obtains content encryption/decryption keys from the rights server 105, which may include or be attached to a separate management (DRM) server of the backend, and uses the keys to encrypt content for storage and later delivery in encrypted form. The backend may employ the rights server 105 as focal point for DRM-related operations and communications, in which case a separate DRM server may be more specifically tailored for encryption key generating, storage and retrieval using appropriate network protocols.

Figure 2:
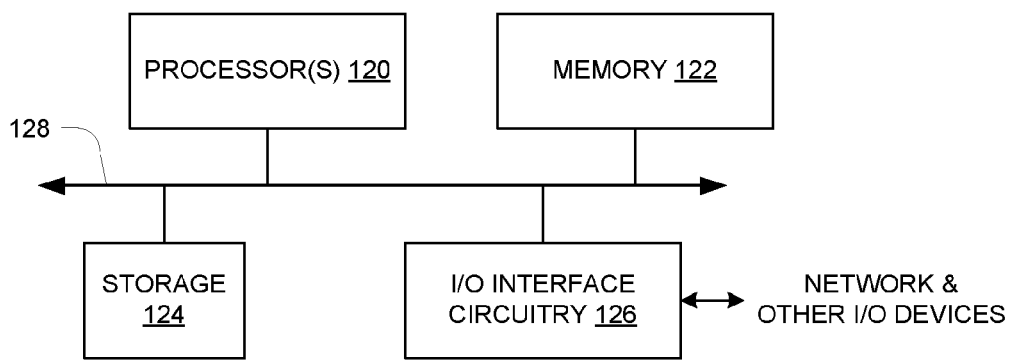
FIG. 2 is a block diagram of a computerized device from a hardware perspective.

FIG. 2 is a generalized depiction of a computerized device such as may be used to realize the client device 110 and a server of the backend. It includes one or more processors 120, memory 122, local storage 124 and input/output (I/O) interface circuitry 126 coupled together by one or more data buses 128. The I/O interface circuitry 126 couples the device to one or more external networks (such as network 112), additional storage devices or systems, and other input/output devices as generally known in the art. System-level functionality of the computerized device as described herein is provided by the hardware executing computer program instructions (software), typically stored in the memory 122 and retrieved and executed by the processor(s) 120. Any description herein of a software component performing a function is to be understood as a shorthand reference to operation of a computer or computerized device when executing the instructions of the software component. Also, the collection of components in FIG. 2 may be referred to as "processing circuitry", and when executing a given software component may be viewed as a function-specialized circuit, for example as a "player circuit" when executing a software component implementing a content player function. As described below, the client device 110 includes a more specialized hardware organization for purposes of security.

In one embodiment the client device 110 has a specialized organization lending itself to sensitive applications including the DRM aspects of media delivery and playback. In particular, the client device 110 may partition circuitry and functionality between a secure execution environment and a normal or non-secure environment. Hardware components may be partitioned include an application processor in the non-secure environment and a separate secure processor in the secure environment. Operating software in the non-secure environment may include an operating system (O/S) and a content player application (referred to as an "app"). In one embodiment, the operating system is the Android® operating system for mobile devices. The components in the secure environment are responsible for establishing a root of trust with the backend to enable the client device 110 to obtain decryption keys for decrypting content. The secure environment includes a secure kernel and secure memory. The client device also includes a media client that sends requests to the backend to register the device 110, obtain rights objects for playback of media objects, and performs other functions that enable decryption and playing of media objects. The media client may have separate secure and non-secure portions partitioned between the secure and non-secure environments accordingly.

In one embodiment, the secure environment of the client device 110 may employ components of the so-called Trust-Zone family, including the secure processor realized according to the ARM architecture, as well as the secure kernel and secure memory which are specially tailored for security-related uses. Establishing a root of trust may be based partly on security features offered by the secure processing hardware that is embedded in a circuit board used to build a device 110 (e.g., mobile phone handset). A chipset manufacturer provides the hardware, and a device manufacturer (OEM) loads certain firmware (code) such as described more below.

Figure 3:
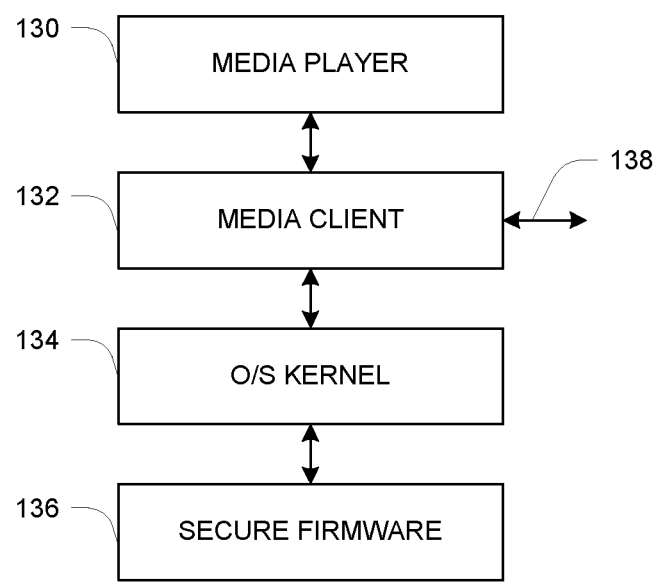
FIG. 3 is a block diagram of a client device from primarily a software perspective.

FIG. 3 shows an organization of the client device 110 from a software perspective, which also reflects the above-described partitioning between secure and non-secure environments. It includes a media player 130, media client 132, operating system (OS) kernel 134 and secure firmware 136. The media client 132 has a functional connection 138 to the backend (i.e., CDN 108, rights server 105 and WFM 102 via proxy 109). In operation, the media player 130 renders media such as video on a suitable facility of the client device 110, such as a display. The media player 130 also includes a graphical user interface enabling a user to control the selection and playback of media, as generally known in the art. The media client 132 performs various functions related to the downloading of media for playback (rendering), including overall control of device registration, delivery of encryption keys, and downloading of media (content) from the CDN 108.

Figure 4:
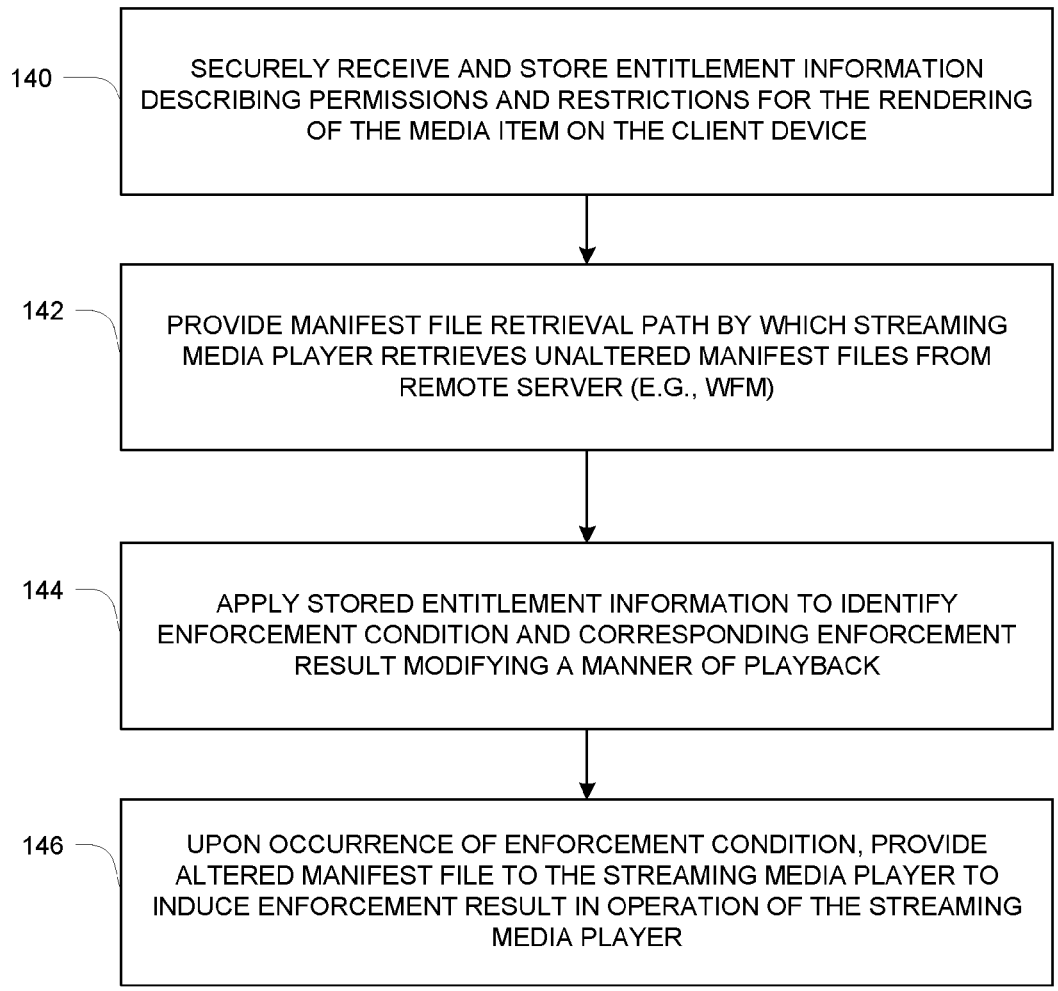
FIG. 4 is a high-level flow diagram of operation of a proxy.

FIG. 4 is a high-level flow description of operation of the proxy 109 for enforcing entitlements for media playback at the client device 110.

At 140, the proxy 109 securely receives and stores, during streaming operation, entitlement information describing permissions and restrictions for the rendering of the media item on the client device 110. The entitlement information is received from a rights server and is securely stored at the proxy to prevent unauthorized alteration of stored entitlement information.

At 142, the proxy 109 provides a manifest file retrieval path by which the streaming media player 130 retrieves unaltered manifest files from a remote server (e.g., WFM 102) for use in an entitled playback of a media item.

At 144, the proxy 109 applies the stored entitlement information to identify both an enforcement condition and a corresponding enforcement result for an entitlement, the enforcement condition being based at least in part on the sensed operating context of the client device, the enforcement result modifying a manner of playback from the playback permitted in the absence of the enforcement condition. As an example, an enforcement condition may be that the client device 110 is downloading the content over a WiFi connection (as opposed to a cellular link, for example), and the enforcement result is that normal playback is permitted (as opposed to being unavailable or modified in some manner, for example). Several examples of entitlements are given below.

At 146, upon occurrence of the enforcement condition, the proxy 109 provides an altered manifest file to the streaming media player to induce the enforcement result in the operation of the streaming media player.

3. Specific Entitlement Enforcement Operations

Generally, entitlement enforcement includes configuring a wide variety of entitlements at a server (e.g., WFM 102); determining applicable combination of entitlements for a given client request; sending entitlements to the requesting client securely; handling entitlement information securely on a plurality of client devices at run time; storing entitlement information securely on a plurality of client devices for offline use; and enforcing entitlements on a plurality of client devices.

The following is an outline summary of certain specific aspects of entitlement enforcement operations.

1. The content protected by entitlements may be audio/video content.
   a. The content may be encrypted with a per content asset encryption key
2. Entitlements that may be configured include: the time at which clients are allowed to start viewing a content item; the time at which the rights for a content item expire; number of times a content item may be viewed; whether clients are allowed to view content over 3G network, 4G network, or a WiFi network; whether content item may be viewed on a class of device, e.g., desktop computer, mobile phone, tablet, Set Top Box, Google Glass; whether content may be streamed or downloaded for offline viewing; whether content is viewable on a jail-broken device; whether the user is allowed to rewind, pause, or fast forward content; minimum and maximum bitrate limits; maximum file size in case of download for offline use; maximum number of advertisements allowed; parental control ratings; specification for a geographical area within which clients may consume content; blackout segments within a linear channel, along with alternative images or streams (sorry stream) which clients must display in lieu of the original content; whether clients are allowed to output content to externally connected devices, e.g., via HDMI output, Apple's AirPlay, or Miracast; whether session shifting (i.e., sharing bookmarks between devices) is allowed; starting and ending positions within a content item delineating the fragment which clients are allowed to view (e.g., for previews);
3. Entitlements may be configured for a given content owner and: a group of users; an individual user; a group of content items; a particular content item; a particular class of device; a particular device in use by a particular user; or any combination thereof.
   a. Enforcement may include determining the set of entitlements applicable to a particular content owner, user, and device, in response to a request from a client for playback authorization or re-authorization for a given content asset.
      i. A request may be responded to with a denial or error message if the client is not authorized for playback.
      ii. The server may encrypt pertinent entitlement information using a unique session encryption key and communicating encrypted entitlements to the requesting client, so that only the requesting client is able to decrypt that entitlement information.
         1. The client specific encrypted entitlement information may also include the content decryption key for the content asset requested for playback.
4. A user-downloadable and installable, or factory pre-installed, client application may contain a Media Client and a Digital Rights Management (DRM) Agent, both of which are developed and hardened against reverse-engineering specifically for each client platform.
   a. The Media Client may receive encrypted entitlements information from the server and handling it securely at run-time.
   b. The Media Client may store encrypted entitlement information to its local device-specific persistent storage area segregated on a per content owner, per content asset and per user basis.
   c. A native media player may be used for rendering of the content asset.
      i. The Media Client may use and provide wrappers for platform-specific Application Programming Interfaces (API) to enforce entitlements prior to the start of, and during content viewing (e.g., starting and stopping playback or preventing playback and seek operations).
   d. A third-party media player may be used with the client application for rendering of the content asset.
      i. The Media Client may use and provide wrappers for the third-party player-specific Application Programming Interfaces (API) to enforce entitlements prior to the start of, and during content viewing (e.g., starting and stopping playback or preventing playback and seek operations).
   e. Content may be delivered to the media player via an HTTP adaptive streaming protocol, e.g., HTTP Live Streaming (HLS), Dynamic Adaptive Streaming over HTTP (DASH), Smooth Streaming (SS), or HTTP Dynamic Streaming (HDS).
      i. The Media Client may construct a plurality of manifest files, e.g., HLS m3u8, DASH MPD, or SS/HDS manifests, and serving the manifest files from an internal HTTP proxy server to either the native or a third-party media player.
         1. The HTTP proxy server may respond with an HTTP error code, such as 403 Unauthorized, to the player, if content viewing must be stopped.
         2. The HTTP proxy server may insert an end of stream indicator (e.g., an m3u8 #EXT-X-END-LIST tag) into the manifest files and omitting further content URIs to indicate to the player when viewing must be stopped.
   f. The HTTP proxy server may replace content segments in the manifest files with alternate segment URIs which contain alternate content (e.g., error message for the particular condition, or substitute content for geo-location-based blackouts) to prevent the original content from being viewed.

The client application may be user-upgradeable so that support for new entitlements added to the server, as well as other updates, can be used by clients.

Figure 5:
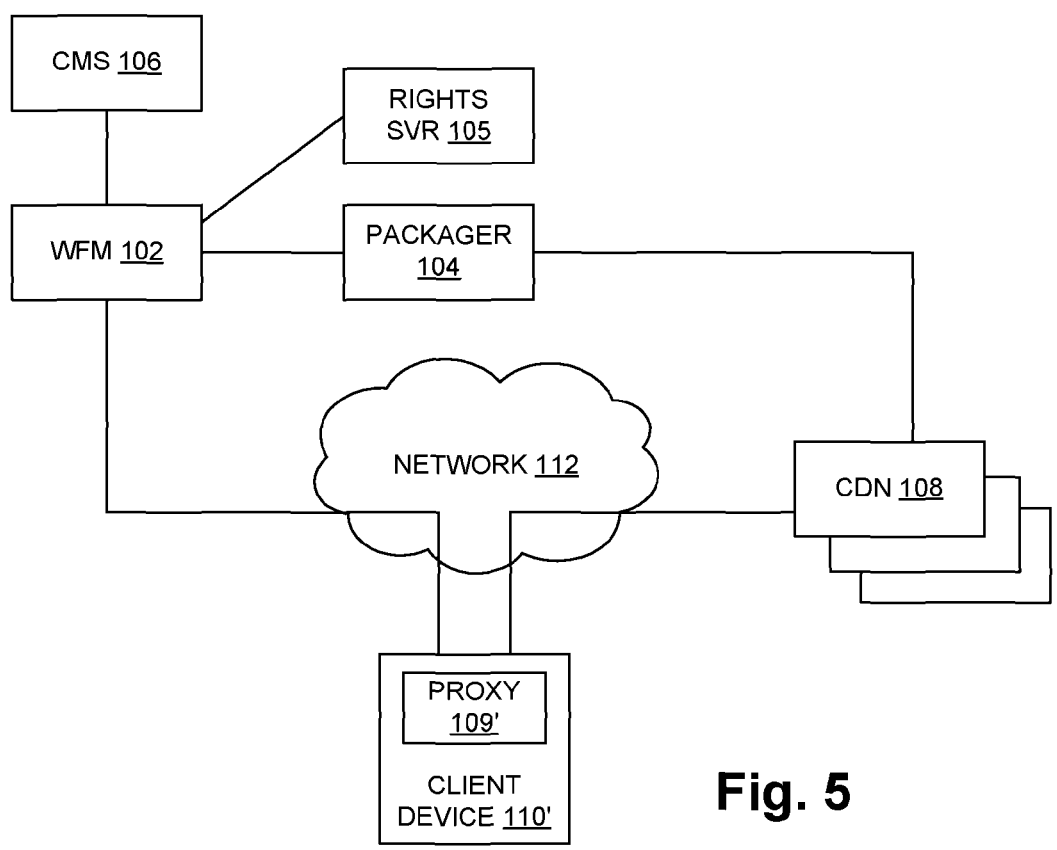
FIG. 5 is a block diagram of an alternative configuration of a media distribution system.

FIG. 5 shows an alternative arrangement in which the proxy 109' is located on the client device 110' rather than outside the client device 110 as in FIG. 1. In this arrangement the proxy 109' communicates with other components such as the media client 132 (FIG. 3) using an internal mechanism such as inter-process communications rather than requiring a network stack for communicating over an external network 112 such as in the arrangement of FIG. 1.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computerized device as a proxy server to enforce entitlements for media playback at a client device, the client device having an operating context and executing a segment-based streaming media player for rendering a media item using a series of media segments retrieved from a remote media server according to contents of a manifest file delivered to the streaming media player, comprising:

securely receiving and storing, during streaming operation, entitlement information describing permissions and restrictions for the rendering of the media item on the client device, the entitlement information being received from a rights server and being securely stored at the computerized device to prevent unauthorized alteration of stored entitlement information; and by the proxy server, providing a manifest file retrieval path by which the streaming media player retrieves unaltered manifest files from the remote media server for use in an entitled playback of a media item, the proxy server (a) applying the stored entitlement information to identify both an enforcement condition and a corresponding enforcement result for an entitlement, the enforcement condition being based at least in part on the sensed operating context of the client device, the enforcement result modifying a manner of playback from the playback permitted in the absence of the enforcement condition, and (b) upon occurrence of the enforcement condition, providing an altered manifest file to the streaming media player to induce the enforcement result in the operation of the streaming media player.

2. The method of claim 1, wherein;
the computerized device is a server device distinct from the client device;
the entitlement information is received via a first network link to the rights server;
the manifest file retrieval path includes the first network link and a second network link between the client device and the server device; and
the altered manifest file is provided from the server device to the streaming media player via the second network link.

3. The method of claim 1, wherein;
the computerized device is the client device;
the entitlement information is received via a network link to the rights server;
the manifest file retrieval path includes the network link and an internal communications mechanism between the proxy server and the streaming media player in the client device; and
the altered manifest file is provided from the proxy server to the streaming media player via the internal communications mechanism.

4. The method of claim 1, wherein the content protected by entitlements is audio/video content.

5. The method of claim 4, wherein the content is encrypted with a per content asset encryption key.

6. The method of claim 1, wherein the permissions and restrictions described by the entitlement information include permissions and restrictions for viewing time, network type, class of device, streaming versus offline, jail-broken status of device, trick play, bitrate limits; maximum file size for offline viewing; number of advertisements; parental control ratings; geographical area; blackout and alternative images or streams displayed in lieu of original content; outputting to externally connected devices, sharing, and starting and ending positions.

7. The method of claim 1, wherein entitlements are configured for a given content owner and: a group of users; an individual user; a group of content items; a particular content item; a particular class of device; a particular device in use by a particular user; or any combination thereof.

8. The method of claim 7, further comprising obtaining a set of entitlements applicable to a particular content owner, user, and device, in response to a request from a client for playback authorization or re-authorization for a given content asset.

9. The method of claim 8, wherein the entitlement information is encrypted using a unique session encryption key and encrypted entitlements are delivered to the client device so that only the client device is able to decrypt that entitlement information.

10. The method of claim 9, wherein the client specific encrypted entitlement information also includes the content decryption key for the content asset requested for playback.

11. The method of claim 1, wherein user-downloadable and installable, or factory pre-installed client application contains a Media Client and a Digital Rights Management (DRM) Agent, both of which are developed and hardened against reverse-engineering specifically for each client platform.

12. The method of claim 11, wherein the Media Client stores encrypted entitlement information to its local device-specific persistent storage area segregated on a per content owner, per content asset and per user basis.

13. The method of claim 11, wherein a native media player is used for rendering of the content asset.

14. The method of claim 13, wherein the Media Client uses and provides wrappers for platform-specific Application Programming Interfaces (API) to enforce entitlements prior to the start of, and during content viewing.

15. The method of claim 11, wherein a third-party media player is used with the client application for rendering of the content asset.

16. The method of claim 15, wherein the Media Client uses and provides wrappers for the third-party player-specific Application Programming Interfaces (API) to enforce entitlements prior to the start of, and during content viewing.

17. The method of claim 11, wherein content is delivered to the media player via an HTTP adaptive streaming protocol being one of HTTP Live Streaming (HLS), Dynamic Adaptive Streaming over HTTP (DASH), Smooth Streaming (SS), or HTTP Dynamic Streaming (HDS).

18. The method of claim 17, wherein the Media Client constructs a plurality of manifest files being one of HLS m3u8, DASH MPD, or SS/HDS manifests, and serves the manifest files from an internal HTTP proxy server to either the native or a third-party media player.

19. The method of claim 18, wherein the HTTP proxy server responds with an HTTP error code to the media player if content viewing must be stopped.

20. The method of claim 18, wherein the HTTP proxy server inserts an end of stream indicator into the manifest files and omits further content URIs to indicate to the player when viewing must be stopped.

21. The method of claim 18, wherein the HTTP proxy server replaces content segments in the manifest files with alternate segment URIs which contain alternate content to prevent the original content from being viewed.

22. The method of claim 11, wherein the media client application is user-upgradeable so that support for new entitlements added to the server, as well as other updates, can be used by the client device.

23. The method of claim 1, wherein the manifest file is altered by replacing content segment Uniform Resource Identifiers (URIs) with alternate content segment URIs which contain alternate content to prevent an original form of the media item from being rendered.

24. The method of claim 1, wherein the enforcement condition is that the client device is downloading the media item over a WiFi connection and the enforcement result is that normal playback of the media item is permitted.

25. The method of claim 1, wherein the enforcement condition is that the client device is downloading the media item over a cellular link and the enforcement result is that normal playback of the media item is unavailable or modified in some manner.

26. A computerized device operating as a proxy server to enforce entitlements for media playback at a client device, the client device having an operating context and executing a segment-based streaming media player for rendering a media item using a series of media segments retrieved from a remote media server according to contents of a manifest file delivered to the streaming media player, the computerized device comprising:
  a processor; and,
  a memory that stores processor-executable instructions, wherein the processor interfaces with the memory to execute the processor-executable instructions, whereby the computerized device is operable to:
  securely receive and store, during streaming operation, entitlement information describing permissions and restrictions for the rendering of the media item on the client device, the entitlement information being received from a rights server and being securely stored at the computerized device to prevent unauthorized alteration of stored entitlement information; and
  provide a manifest file retrieval path by which the streaming media player retrieves unaltered manifest files from the remote media server for use in an entitled playback of a media item, the computerized device further operable to (a) apply the stored entitlement information to identify both an enforcement condition and a corresponding enforcement result for an entitlement, the enforcement condition being based at least in part on the sensed operating context of the client device, the enforcement result modifying a manner of playback from the playback permitted in the absence of the enforcement condition, and (b) upon occurrence of the enforcement condition, provide an altered manifest file to the streaming media player to induce the enforcement result in the operation of the streaming media player.

27. The computerized device of claim 26, wherein the manifest file is altered by replacing content segment Uniform Resource Identifiers (URIs) with alternate content segment URIs which contain alternate content to prevent an original form of the media item from being rendered.

28. A client device having an operating context and executing a segment-based streaming media player for rendering a media item using a series of media segments retrieved from a remote media server according to contents of a manifest file delivered to the streaming media player, the client device comprising:
  a processor; and,
  a memory that stores processor-executable instructions, wherein the processor interfaces with the memory to execute the processor-executable instructions, whereby the client device is operable to:
  securely receive and store, during streaming operation, entitlement information describing permissions and restrictions for the rendering of the media item on the client device, the entitlement information being received from a rights server and being securely stored at the computerized device to prevent unauthorized alteration of stored entitlement information; and
  provide a manifest file retrieval path by which the streaming media player retrieves unaltered manifest files from the remote media server for use in an entitled playback of a media item, the client device further operable to (a) apply the stored entitlement information to identify both an enforcement condition and a corresponding enforcement result for an entitlement, the enforcement condition being based at least in part on the sensed operating context of the client device, the enforcement result modifying a manner of playback from the playback permitted in the absence of the enforcement condition, and (b) upon occurrence of the enforcement condition, provide an altered manifest file to the streaming media player to induce the enforcement result in the operation of the streaming media player.

29. The client device of claim 28, wherein the manifest file is altered by replacing content segment Uniform Resource Identifiers (URIs) with alternate content segment URIs which contain alternate content to prevent an original form of the media item from being rendered.

* * * * *